United States Patent
Tuduki et al.

(10) Patent No.: US 10,205,165 B2
(45) Date of Patent: Feb. 12, 2019

(54) NEGATIVE ELECTRODE ACTIVE MATERIAL FOR NONAQUEOUS ELECTROLYTE SECONDARY BATTERIES AND NONAQUEOUS ELECTROLYTE SECONDARY BATTERY

(71) Applicant: SANYO Electric Co., Ltd., Daito-shi, Osaka (JP)

(72) Inventors: Kouhei Tuduki, Kobe (JP); Fukui Atsushi, Hyogo (JP); Taizou Sunano, Moriguchi (JP)

(73) Assignee: SANYO Electric Co., Ltd., Daito-shi (JP)

( * ) Notice: Subject to any disclaimer, the term of this patent is extended or adjusted under 35 U.S.C. 154(b) by 229 days.

(21) Appl. No.: 14/769,233

(22) PCT Filed: Mar. 25, 2014

(86) PCT No.: PCT/JP2014/001694
§ 371 (c)(1),
(2) Date: Aug. 20, 2015

(87) PCT Pub. No.: WO2014/156117
PCT Pub. Date: Oct. 2, 2014

(65) Prior Publication Data
US 2015/0380735 A1   Dec. 31, 2015

(30) Foreign Application Priority Data

Mar. 29, 2013 (JP) .................. 2013-074707

(51) Int. Cl.
*H01M 4/36* (2006.01)
*H01M 4/38* (2006.01)
(Continued)

(52) U.S. Cl.
CPC ............ *H01M 4/386* (2013.01); *H01M 4/366* (2013.01); *H01M 4/5825* (2013.01); *H01M 10/0525* (2013.01); *H01M 2220/30* (2013.01)

(58) Field of Classification Search
CPC ..... H01M 4/366; H01M 4/386; H01M 4/5825
(Continued)

(56) References Cited

U.S. PATENT DOCUMENTS 5,395,711 A   3/1995  Tahara et al.
6,887,511 B1* 5/2005  Shima ................... H01M 4/04
                                                          29/623.1
(Continued)

FOREIGN PATENT DOCUMENTS

CN   101908616 A   12/2010
JP    2997741 B2    1/2000
(Continued)

OTHER PUBLICATIONS

Morita, Tomokazu, Machine Translation of JP 2007-05913 A, Mar. 2007 (Year: 2007).*
(Continued)

*Primary Examiner* — Sean P Cullen
(74) *Attorney, Agent, or Firm* — Westerman, Hattori, Daniels & Adrian, LLP

(57) ABSTRACT

The invention provides a nonaqueous electrolyte secondary battery having a large battery capacity and excellent charge/discharge cycle characteristics. The nonaqueous electrolyte secondary battery includes a negative electrode including a particulate negative electrode active material (33), a positive electrode and a nonaqueous electrolyte. The particulate negative electrode active material (33) includes a plurality of two-phase regions (34) in the particle wherein the two-phase regions include a first phase (A) containing silicon and a second phase (B) containing silicon oxide disposed on the
(Continued)

periphery of the first phase, the negative electrode active material being such that the ratio of the intensity at 480 cm$^{-1}$ wavelength to the intensity at 510 cm$^{-1}$ wavelength in a Raman spectrum obtained by Raman spectroscopy is not more than 0.1 and the ratio of the intensity at 2θ=21.6 to the intensity at 2θ=28.4 in an X-ray diffraction pattern obtained by X-ray diffractometry is not more than 0.1.

8 Claims, 6 Drawing Sheets

(51) Int. Cl.
*H01M 4/58* (2010.01)
*H01M 10/0525* (2010.01)

(58) Field of Classification Search
USPC .................................. 429/218.1; 252/182.1
See application file for complete search history.

(56) References Cited

U.S. PATENT DOCUMENTS

| | | | | |
|---|---|---|---|---|
| 2002/0164479 | A1* | 11/2002 | Matsubara | H01M 4/362 428/367 |
| 2003/0215711 | A1* | 11/2003 | Aramata | B82Y 30/00 429/218.1 |
| 2009/0035651 | A1* | 2/2009 | Hirose | H01M 4/134 429/164 |
| 2009/0162750 | A1* | 6/2009 | Kawakami | H01G 11/46 429/218.1 |
| 2009/0181304 | A1* | 7/2009 | Miyamoto | C23C 14/3414 429/218.1 |
| 2009/0311606 | A1 | 12/2009 | Fukuoka et al. | |
| 2010/0288970 | A1 | 11/2010 | Watanabe et al. | |
| 2012/0258371 | A1 | 10/2012 | Nakanishi et al. | |
| 2012/0321949 | A1 | 12/2012 | Kawakami et al. | |
| 2013/0078490 | A1* | 3/2013 | Morita | H01M 4/133 429/92 |

FOREIGN PATENT DOCUMENTS

| | | | |
|---|---|---|---|
| JP | 2002083594 A | * | 3/2002 |
| JP | 2005-85717 A | | 3/2005 |
| JP | 2007059213 A | * | 3/2007 |
| JP | 4081676 B2 | | 4/2008 |
| JP | 2009-164104 A | | 7/2009 |
| JP | 2009-301935 A | | 12/2009 |
| JP | 2011-100616 A | | 5/2011 |
| JP | 2012-221758 A | | 11/2012 |
| JP | 2012-256539 A | | 12/2012 |
| JP | 2014-10890 A | | 1/2014 |

OTHER PUBLICATIONS

Ikeda, Hiroaki, Machine Translation of JP 2002-083594 A, Mar. 2002 (Year: 2002).*

International Search Report dated May 27, 2014, issued in counterpart International Application No. PCT/JP2014/001694 (2 pages).

Hua-Chao Tao et al., "Interweaved Si@Siox/C nanoporous spheres as node materials for Li-ion batteries", Solid State Ionics, 2012, vol. 220, pp. 1-6.

English translation of Chinese Office Action dated Jan. 22, 2017, issued in counterpart Chinese Patent Application No. 201480002331.7.

Office Action dated Aug. 14, 2017, issued in counterpart Chinese Application No. 201480002331.7, with English translation (12 pages).

* cited by examiner

NEGATIVE ELECTRODE ACTIVE MATERIAL FOR NONAQUEOUS ELECTROLYTE SECONDARY BATTERIES AND NONAQUEOUS ELECTROLYTE SECONDARY BATTERY

TECHNICAL FIELD

The present invention relates to a negative electrode active material for nonaqueous electrolyte secondary batteries and to a nonaqueous electrolyte secondary battery.

BACKGROUND ART

Materials containing silicon (silicon materials) can store lithium ions in a larger amount per unit volume than the currently used carbon materials such as graphite. Because of their high capacity, the use of such materials for negative electrode active materials has been studied. However, the fact that the silicon materials exhibit a large volume change during the insertion and extraction of lithium ions causes a problem that negative electrode active materials including the silicon materials are broken into fine powders by repeated charging and discharging to make it impossible to obtain good cycle characteristics.

In light of such circumstances, for example, it has been proposed that lithium metasilicate ($Li_2SiO_3$) or silicon dioxide ($SiO_2$) is used as a negative electrode active material (see Patent Literature 1). It is also proposed that a silicon composite powder in which 2 wt % to 36 wt % silicon fine crystals are dispersed in silicon dioxide is used as a negative electrode active material (see Patent Literature 2).

CITATION LIST

Patent Literature

PTL 1: Japanese Patent No. 2997741
PTL 2: Japanese Patent No. 4081676

SUMMARY OF INVENTION

Technical Problem

However, the techniques disclosed in the above patent literatures cannot fully meet the market needs in terms of the capacity and the charge/discharge cycle characteristics of nonaqueous electrolyte secondary batteries. That is, there has been a demand for further enhancements in capacity and cycle characteristics.

Solution to Problem

A negative electrode active material for nonaqueous electrolyte secondary batteries according to the present invention is a particulate negative electrode active material for use in nonaqueous electrolyte secondary batteries which includes a plurality of regions in the particle wherein the regions include a first phase containing silicon and a second phase containing silicon oxide disposed on the periphery of the first phase, the negative electrode active material being such that the ratio of the intensity at 480 $cm^{-1}$ wavelength to the intensity at 510 $cm^{-1}$ wavelength in a Raman spectrum obtained by Raman spectroscopy is not more than 0.1 and the ratio of the intensity at $2\theta=21.6$ to the intensity at $2\theta=28.4$ in an X-ray diffraction pattern obtained by X-ray diffractometry is not more than 0.1.

A nonaqueous electrolyte secondary battery according to the present invention includes a negative electrode including the negative electrode active material for nonaqueous electrolyte secondary batteries, a positive electrode and a nonaqueous electrolyte.

Advantageous Effects of Invention

According to the present invention, nonaqueous electrolyte secondary batteries having a large battery capacity and excellent charge/discharge cycle characteristics may be provided.

DESCRIPTION OF EMBODIMENTS

Hereinbelow, embodiments of the present invention will be described in detail with reference to the drawings. The drawings referred to in the embodiments are schematics and may illustrate constituent elements in different configurations such as size proportions from the actual configurations. Specific configurations such as size proportions should be estimated in light of the following description.

As used in the specification, the term "substantially **" such as in "substantially the same" means that objects being compared are completely the same as each other as well as that the objects may be regarded substantially the same as each other.

A nonaqueous electrolyte secondary battery 10 described below (hereinafter, simply written as "secondary battery 10") represents an example of the embodiments of the invention. The secondary battery 10 is a so-called laminate battery that includes a package 11 composed of laminate materials. However, the configurations in the invention are not limited thereto and may be other various forms of batteries such as, for example, prismatic batteries, cylindrical batteries and coin batteries including metal battery cases. While the electrode assembly is described later as having a wound structure, the structures are not limited thereto and may be, for example, alternate stacks of positive electrodes and negative electrodes via separators.

The configurations of secondary batteries 10 will be described in detail with reference to FIGS. 1 to 4.

Figure 1:
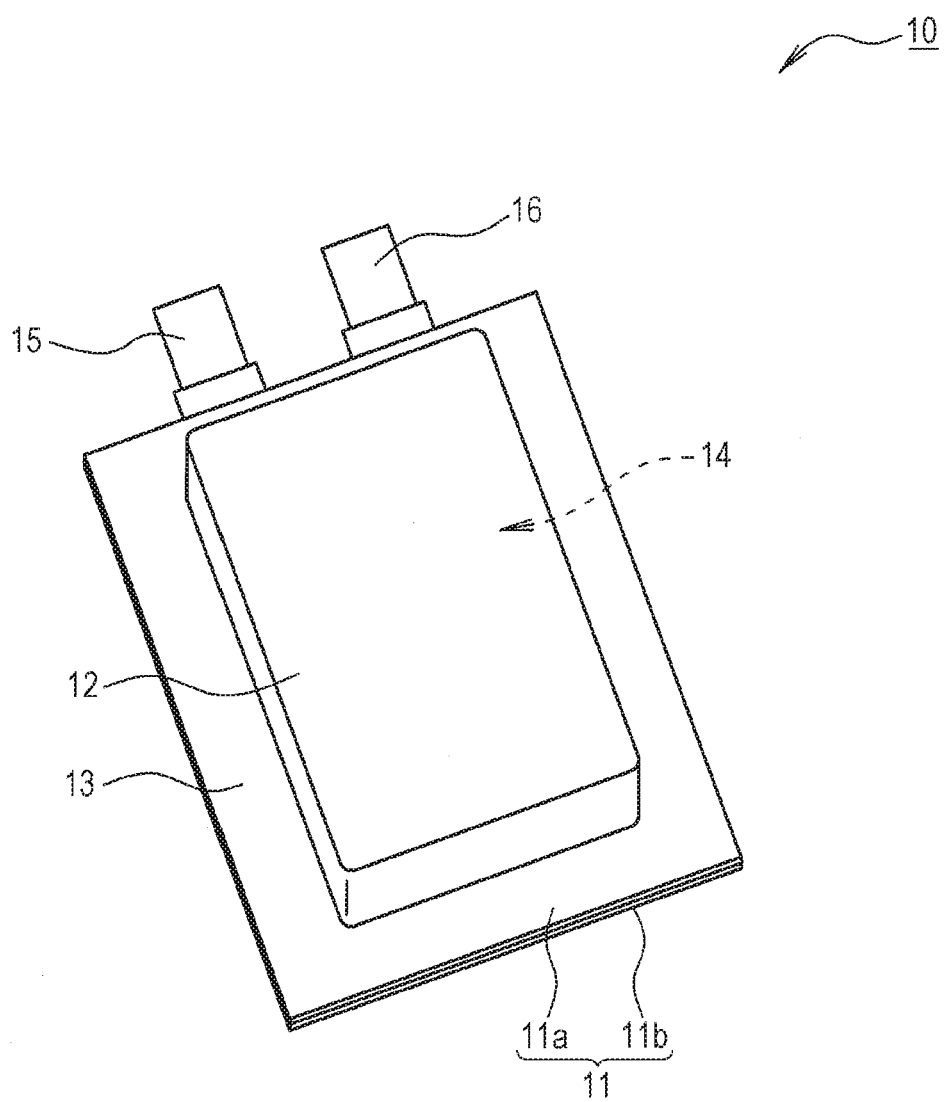
FIG. 1 is a view illustrating a nonaqueous electrolyte secondary battery according to an example of an embodiment of the present invention.
Figure 2:
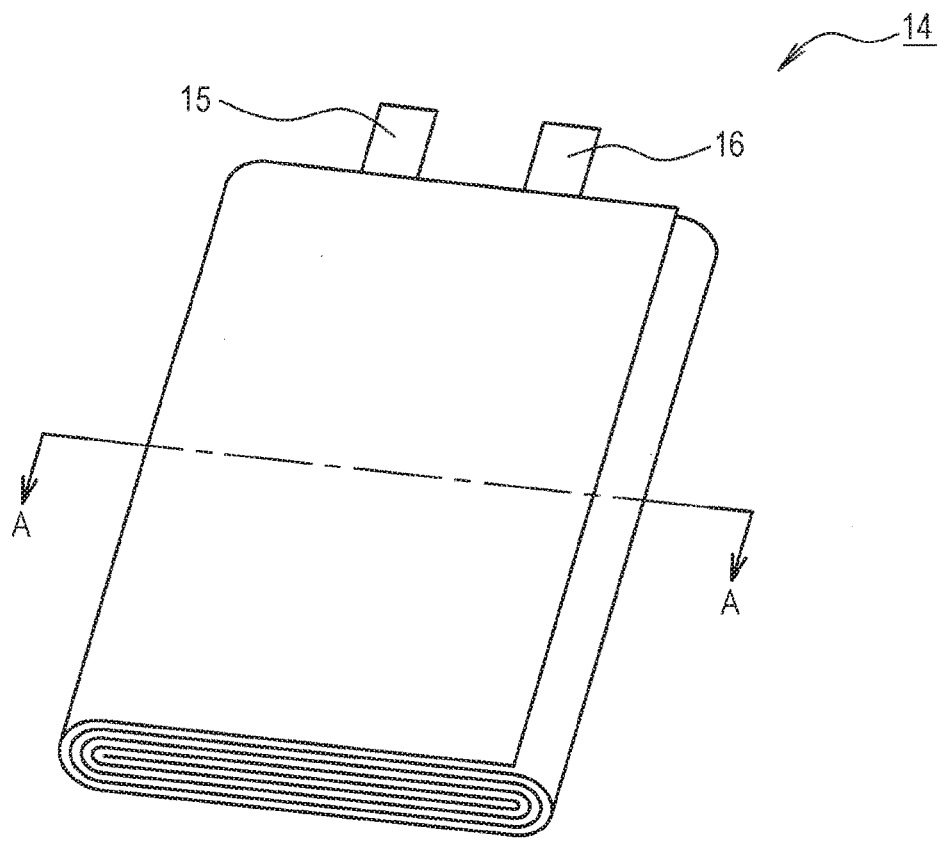
FIG. 2 is a view illustrating an electrode assembly according to an example of an embodiment of the present invention.
Figure 3:
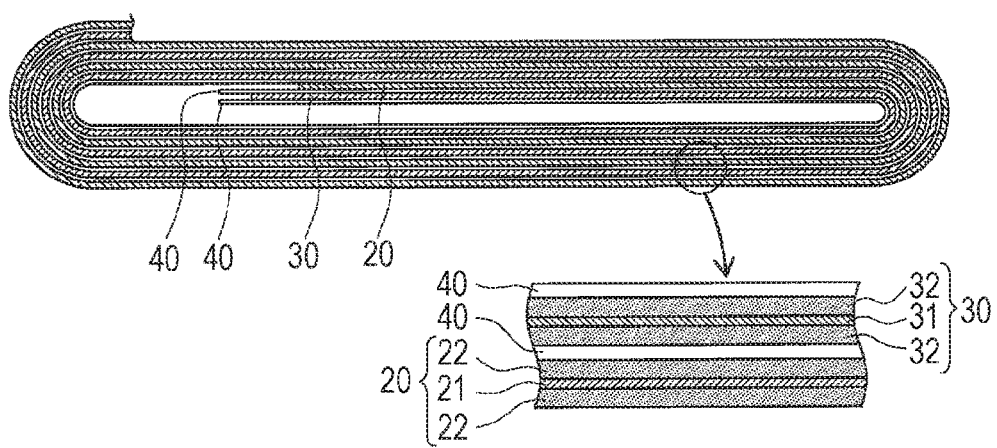
FIG. 3 is a view illustrating a cross section taken along line AA in FIG. 2.
Figure 4:
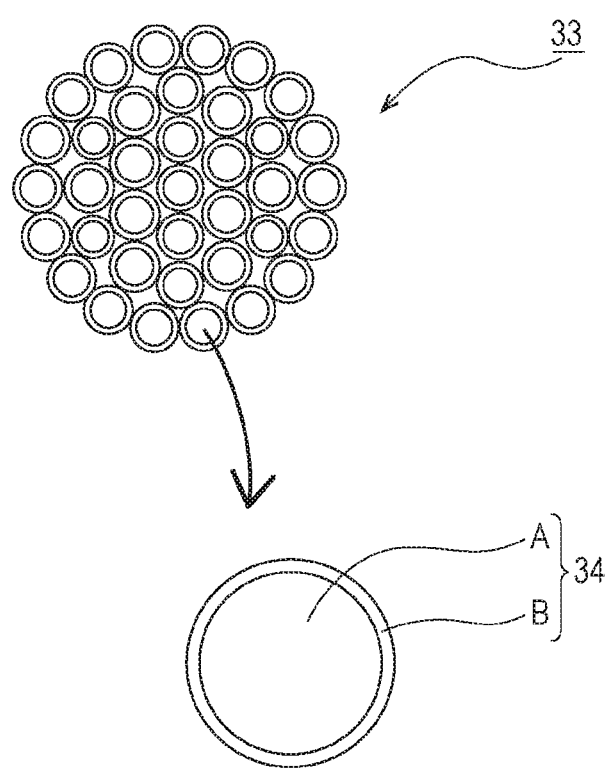
FIG. 4 is a view illustrating a cross section of a negative electrode active material according to an example of an embodiment of the present invention.

FIG. 1 is a view illustrating an appearance of the secondary battery 10. FIG. 2 illustrates a separate electrode assembly 14 for constituting the secondary battery 10. FIG. 3 illustrates a cross section taken along line AA in FIG. 2. FIG. 4 illustrates a cross section of a particle of a negative electrode active material 33 (hereinafter, written as "negative electrode active material particle(s) 33") for constituting a negative electrode 30.

As illustrated in FIG. 1, the secondary battery 10 includes a package 11 composed of two laminate films 11a and 11b. An electrode assembly 14 and a nonaqueous electrolyte (not shown) are accommodated in an inner space or a container section 12 defined between the laminate films 11a and 11b. The package 11 has a seal 13 that is formed by the bonding between the laminate films 11a and 11b, and the container section 12 containing the components such as the electrode assembly 14 is tightly closed by the seal.

The shape of the secondary battery 10, namely, the shape of the package 11 is not particularly limited. For example, as illustrated in FIG. 1, the shape may be substantially rectangular in a plan view. Here, the phrase "in a plan view" means that the package is seen from a direction perpendicular to the principal surface (the largest surface) of the laminate films 11a and 11b. The seal 13 may be formed in the form of a frame having a substantially uniform width along the edge of the package 11. The substantially rectangular area in a plan view that is enclosed by the seal 13 defines the container section 12.

In the secondary battery 10, a positive electrode tab 15 and a negative electrode tab 16 are connected to a positive electrode 20 and a negative electrode 30, respectively, of the electrode assembly 14, and these tabs are drawn out of the container section 12. Preferably, the tabs are drawn out substantially parallel to each other from the same end of the package 11. For example, the tabs are made of metals based on nickel or copper.

As illustrated in FIGS. 2 and 3, the electrode assembly 14 has a wound structure in which the positive electrode 20 and the negative electrode 30 are wound via separators 40. For example, the electrode assembly 14 has a flat shape that is formed by crushing a wound cylindrical assembly including the constituent components in one direction perpendicular to the axial direction. The electrode assembly 14 includes the separator 40, the negative electrode 30, the separator 40 and the positive electrode 20 in the order of stacking from the inside. The order of stacking of the constituent components is not limited to the one described above.

[Positive Electrodes 20]

The positive electrode 20 has a positive electrode collector 21 and a positive electrode active material layer 22 disposed on the collector. It is preferable that the positive electrode active material layers 22 be disposed on both sides of the positive electrode collector 21. The positive electrode collectors 21 may be conductive thin sheets, in particular, metal foils, alloy foils and metal-coated films which are stable at the potential of the positive electrode 20. The metals constituting the positive electrode collectors 21 are preferably aluminum-based metals, for example, aluminum and aluminum alloys.

The positive electrode active material layer 22 preferably includes a binder and a conductive material in addition to the positive electrode active material. Examples of the positive electrode active materials include lithium transition metal oxides containing a transition metal element such as Co, Mn or Ni. Examples of the lithium transition metal oxides include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$ and $Li_2MPO_4F$ (M: at least one of Na, Mg, Sc, Y, Mn, Fe, Co, Ni, Cu, Zn, Al, Cr, Pb, Sb and B). Here, $0<x\leq1.2$ (as measured immediately after the preparation of the active material and variable by charging and discharging), $0<y\leq0.9$ and $2.0\leq z\leq2.3$.

The binder may be used to ensure a good contact maintained between the positive electrode active material and the conductive material and to increase the binding properties of the materials such as the positive electrode active material with respect to the surface of the positive electrode collector. Examples of the binders include polytetrafluoroethylene (PTFE), polyvinylidene fluoride (PVdF) and derivatives thereof. The binder may be used in combination with a thickener such as carboxymethylcellulose (CMC) or polyethylene oxide (PEO). The conductive material may be used to enhance the electrical conductivity of the positive electrode active material layer. Examples of the conductive materials include carbon materials such as carbon black, acetylene black, Ketjen black and graphite. These materials may be used singly, or two or more may be used in combination.

[Negative Electrodes 30]

The negative electrode 30 has a negative electrode collector 31 and a negative electrode active material layer 32 disposed on the collector. It is preferable that the negative electrode active material layers 32 be disposed on both sides of the negative electrode collector 31. The negative electrode collectors 31 may be conductive thin sheets, in particular, metal foils, alloy foils and metal-coated films which are stable at the potential of the negative electrode 30. The metals constituting the negative electrode collectors 31 are preferably copper-based metals.

The negative electrode active material layer 32 preferably includes a binder and a conductive material in addition to the negative electrode active material particles 33 (see FIG. 4). The binder may be similar to one used in the positive electrode such as polytetrafluoroethylene, but the use of other binders such as styrene-butadiene rubber (SBR) and polyimide is preferable. The binder may be used in combination with a thickener such as carboxymethylcellulose. The conductive material may be similar to one used in the positive electrode active material layer 22 such as graphite. The negative electrode active material may be composed solely of the negative electrode active material particles 33 or may include other negative electrode active materials such as graphite.

As illustrated in FIG. 4, the negative electrode active material particles 33 include a plurality of two-phase regions 34 in the particle wherein the two-phase regions include a first phase A containing silicon (Si) and a second phase B containing silicon oxide disposed on the periphery of the phase A. Preferably, the phase A is composed solely of silicon and the phase B solely of silicon oxide. Silicon can store lithium ions in a larger amount per unit volume than carbon materials such as graphite. Thus, the use of silicon in the negative electrode active material makes it possible to increase the capacity. On the other hand, silicon has a problem in cycle characteristics due to a large volume change during charging and discharging. However, the negative electrode active material particles 33 achieve an improvement in cycle characteristics because the phases B (silicon oxide) present in the particles reduce the volume change. Namely, the phases B serve as buffer phases.

As will be described in detail later, the negative electrode active material particles 33 are produced by sintering two-phase particles 53 having the phase A whose surface is covered with the phase B. Usually, the interface in the two-phase particle 53 (the individual two-phase region 34) is not clear. For example, the two-phase regions 34 in the particle are bonded together as a result of sintering in such a manner that the phases B form a network. Namely, the network formed by the phases B separates the adjacent phases A from one another.

The volume average particle diameter (hereinafter, written as "$D_{50}$") of the negative electrode active material particles 33 is preferably 0.1 µm to 50 µm, more preferably 1 µm to 30 µm, and particularly preferably 5 µm to 20 µm. $D_{50}$ is the median diameter at 50% cumulative volume in the particle size distribution. $D_{50}$ may be measured with a laser diffraction scattering grain size distribution analyzer (for example, "LA-750" manufactured by HORIBA, Ltd.) using water as the dispersion medium.

The BET specific surface area of the negative electrode active material particles 33 is preferably not more than 10 m$^2$/g. The BET specific surface area may be measured by a BET multipoint method using, for example, gas adsorption apparatus "TriStar 23020" manufactured by Micromeritics Japan. If the BET specific surface area is excessively large, the binder decreases its effect on the surface of the negative electrode active material particles 33 to cause a decrease in the adhesion between the negative electrode active material particles 33 and the negative electrode collector 31 or the adhesion between the negative electrode active material particles 33.

The phases A are composed of crystalline silicon, namely, silicon having high crystallinity (a high degree of crystallinity). The degree of crystallinity of silicon may be quantitatively determined by analyzing a Raman spectrum obtained by Raman spectroscopy with respect to the negative electrode active material particles 33. Specifically, crystalline silicon gives rise to a peak at near 510 cm$^{-1}$ wavelength in a Raman spectrum and amorphous silicon shows a peak at 480 cm$^{-1}$, and hence the degree of crystallinity may be quantitatively determined by comparing the intensity at 510 cm$^{-1}$ (hereinafter, written as "$RI_{510}$") to the intensity at 480 cm$^{-1}$ (hereinafter, written as "$RI_{480}$").

The phases A (the negative electrode active material particles 33) have a ratio of $RI_{480}$ to $RI_{510}$ ($RI_{480}/RI_{510}$) of not more than 0.1, preferably not more than 0.05, and more preferably not more than 0.01. That is, it is preferable that the phases A be substantially free from amorphous silicon structures and the silicon in the phases A be crystallized substantially completely. Amorphous silicon and crystalline silicon have different potentials in the reaction with lithium during the first charging process. In the presence of both forms of silicon, lithium is charged selectively to the amorphous phases having a nobler reaction potential, causing nonuniform swelling in the material. This is probably the reason for the decrease in cycle characteristics. On the other hand, the phases A of the negative electrode active material particles 33 in an embodiment are composed solely of crystalline silicon and does not cause such nonuniform swelling, thus making it possible to improve cycle characteristics.

A Raman spectrum of the negative electrode active material particles 33 may be obtained with use of a commercial Raman spectrometer. A preferred example of the Raman spectrometers is microscopic laser Raman spectrometer "Lab RAM ARAMIS" manufactured by HORIBA, Ltd.

The size of the phases A substantially corresponds to the $D_{50}$ of primary particles 51 described later. The size of crystallites 52 (see FIG. 5 discussed later) that make up the phases A is preferably 10 Å to 500 Å, and more preferably 100 Å to 450 Å. As will be described in detail later, the crystallite size may be calculated using the Scherrer equation based on the results of XRD measurement. The above range of the crystallite size ensures that the negative electrode active material particles 33 exhibit higher mechanical strength and higher resistance to breakage, and consequently cycle characteristics are enhanced.

As mentioned earlier, the phases B are composed of silicon oxide. The average thickness thereof is preferably not more than 100 nm, and more preferably 0.1 nm to 10 nm. The average thickness of the phases B may be measured by SEM-EDS or TEM. In the negative electrode active material particles 33, the phases B in the particle are bonded together as a result of treatment such as sintering to form a network structure. That is, the phases B may be described as being finely dispersed with a size of 100 nm or less in the particle. This may be confirmed also based on the results of energy dispersive X-ray spectroscopy (EDS) showing microscopic and uniform distribution of oxygen. Because the silicon oxide in the negative electrode active material particles 33 is dispersed uniformly with a microscopic size, it may serve as a buffer that reduces the swelling and the shrinkage of the active material in spite of the fact that the amount of the silicon oxide is small, thus achieving both enhanced cycle characteristics and higher capacity.

In the negative electrode active material particles 33, the ratio of the intensity at 2θ=21.6 (hereinafter, written as "$XI_{21.6}$") to the intensity at 2θ=28.4 (hereinafter, written as "$XI_{28.4}$") in an XRD pattern obtained by X-ray diffractometry (XRD) is not more than 0.1 ($XI_{21.6}/XI_{28.4}$). In the XRD pattern, Si (111) gives rise to a peak at 2θ=28.4 and $SiO_2$ shows a peak at 2θ=21.6. Hence, the intensity ratio ($XI_{21.6}/XI_{28.4}$) serves as an indicator of the $SiO_2$ content relative to the Si content.

The intensity ratio ($XI_{21.6}/XI_{28.4}$) is preferably not more than 0.01. Because $SiO_2$ is inert to lithium, the first charging/discharging efficiency may be enhanced by the negative electrode active material particles 33 containing $SiO_2$. On the other hand, because $SiO_2$ is an insulator, an excessive increase in the amount of $SiO_2$ leads to a decrease in the conductive properties of the active material and thus can cause a decrease in battery characteristics. Cycle characteristics, battery capacity and conductive properties may be optimized by adjusting the intensity ratio ($XI_{21.6}/XI_{28.4}$) of the negative electrode active material particles 33 in the aforementioned range.

In the negative electrode active material particles 33 (the two-phase regions 34), the molar ratio of oxygen to silicon is preferably O/Si≤0.3, and more preferably 0.01≤O/Si≤0.2. The oxygen to silicon molar ratio may be obtained by EDS measurement. For reasons such as that the phases B composed of silicon oxide have high reactivity with lithium to produce inert reaction products with lithium and also that the reversible capacity depends on the amount of silicon, an increase in the amount of silicon leads to an increase in capacity. On the other hand, silicon oxide is inevitable from the viewpoint of the enhancement of cycle characteristics. In light of these facts, the aforementioned range of the oxygen to silicon molar ratio is advantageous.

Figure 5:
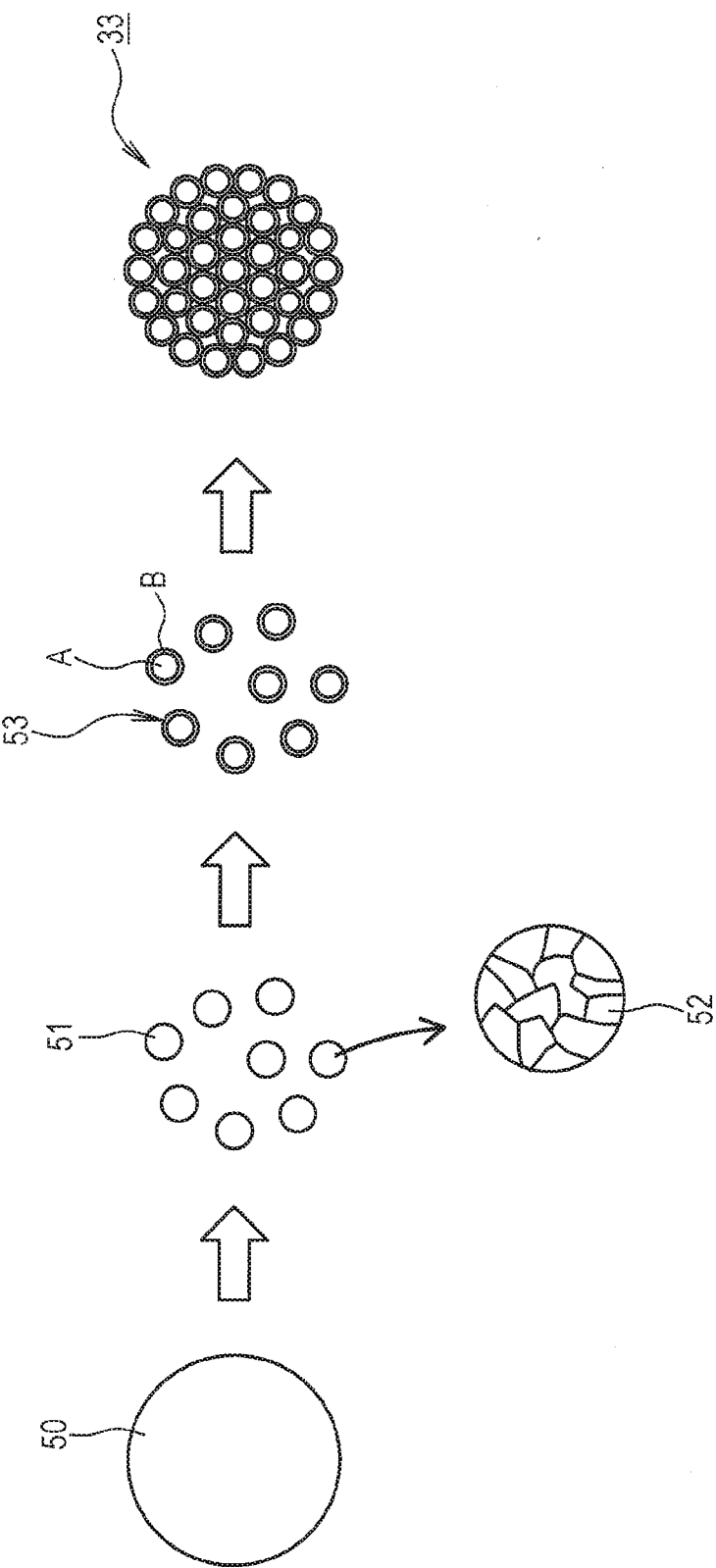
FIG. 5 is a view illustrating a process for producing a negative electrode active material according to an example of an embodiment of the present invention.

FIG. 5 illustrates an example of the process for producing the negative electrode active material particles 33. As illustrated in FIG. 5, the raw material for the negative electrode active material particles 33 is suitably a Si ingot 50 manufactured by a metallurgical method. First, the Si ingot 50 is crushed into particulate Si prisms (not shown) approximately several millimeters in size, and these particles are further crushed into primary particles 51 having a $D_{50}$ of not more than 1 µm, and preferably 0.05 µm to 0.5 µm. The BET specific surface area of the primary particles 51 is preferably not more than 30 $m^2/g$. For example, the Si ingot 50 (the particulate Si prisms) may be crushed with a mechanical milling apparatus (such as a planetary ball mill, a rotary ball mill or Attritor manufactured by Fritsch Japan Co., Ltd.). As described above, the primary particles 51 are aggregates of crystallites 52 having a size of approximately 10 Å to 500 Å, and constitute the phases A in the two-phase regions 34 of the negative electrode active material particles 33.

Next, the primary particles 51 are exposed to the air and the surface is naturally oxidized to form silicon oxide (the phases B). In this manner, two-phase particles 53 are formed which have the Si phase A as the core and the silicon oxide phase B as the shell.

Next, the two-phase particles 53 are sintered to form the negative electrode active material particles 33. The sintering of the two-phase particles 53 may be performed in an inert gas atmosphere under normal pressure and preferably under high pressure. The pressure is preferably not less than 50 MPa, and more preferably 100 MPa to 200 MPa. The sintering temperature is preferably 700° C. to 1400° C., and more preferably 900° C. to 1300° C. If the treatment temperature is excessively low, the surface area of the negative electrode active material particles 33 is excessively increased to make it difficult to obtain a solid electrode plate. On the other hand, the treatment at an excessively high temperature increases the size of the crystallites 52 and tends to result in breakage, and also causes the excessive growth of $SiO_2$ and thus tends to cause decreases in volume change buffering effects and conductive properties. Sintering under high pressure conditions is advantageous in that the treatment temperature may be easily controlled in an appropriate range and dense active material particles may be prepared which have microcrystalline silicon phases and uniformly and finely dispersed silicon oxide phases.

Lastly, the sintered product is crushed and classified to afford the negative electrode active material particles 33 which preferably have a $D_{50}$ of 1 µm to 20 µm. For example, the sintered product may be crushed and classified with use of a jet mill (counter jet mill "AFG" manufactured by HOSOKAWA MICRON CORPORATION).

Figure 6:
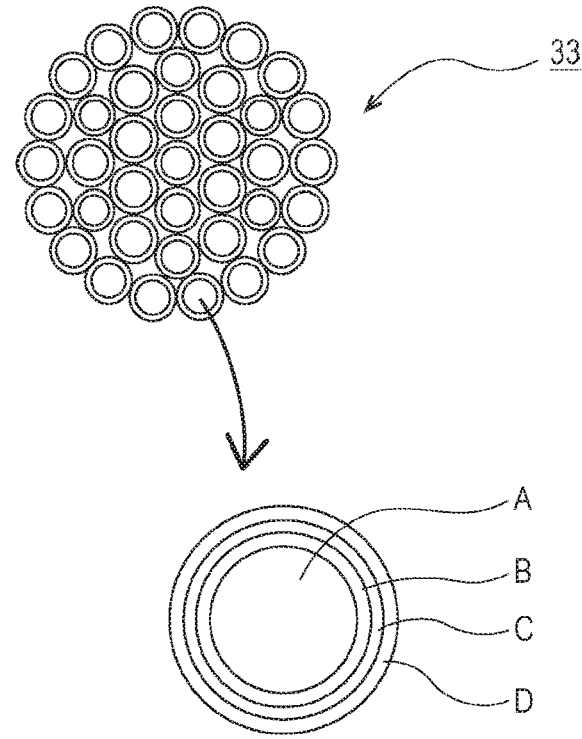
FIG. 6 is a view illustrating a modified example of a negative electrode active material.

While the negative electrode active material particles 33 are illustrated above as being produced by the sintering of the two-phase particles 53 and as having the two-phase regions 34 in the particle which include the phases A and B, the particles may contain a larger number of phases as illustrated in FIG. 6 as an example.

In the example illustrated in FIG. 6, the negative electrode active material particles 33 include a plurality of regions (four-phase regions) in the particle which include a third phase C containing a silicon compound different from the compounds constituting the phases A and B, and a fourth phase D containing a non-silicon compound. The negative electrode active material particles 33 may be such that a plurality of regions (three-phase regions) including one of the phases C and D are present in the particle. While the example in FIG. 6 illustrates the phase B as being covered by the phases C and D, the configuration may be such that the phase A is covered by the phase C and/or the phase D and the silicon oxide phase B is disposed thereon. Alternatively, the phases C and D may be adjacent to the two-phase particles 53.

The silicon compound constituting the phase C is different from the compounds forming the phases A and B, and is, for example, a silicate salt or a silicon alloy. Specifically, preferred examples include silicate salts of alkali metals such as Li and Mg, and alloys with transition metals such as Ti, Co and Ni. Examples further include compounds having Li ion conductivity (for example, glass solid electrolytes such as $Li_2SiO_3$ and $LiO_2$—$B_2O_3$—$SiO_2$).

The non-silicon compound constituting the phase D is a Si-free alloy or compound. Specifically, preferred examples include metals such as Cu, Mn, Fe, Co and Ni, oxides and fluorides of elements such as Li, Be, B, C, Al and Y, rare earth elements and platinum elements and compounds thereof (for example, $Y_2O_3$, $YF_3$, $Er_2O_3$ and Pt), Li ion conductive compounds (for example, glass ceramics, sulfide solid electrolytes, and lithium compounds such as $LiN_3$ and $LiCO_3$), and Li-inserting and releasing compounds (for example, lithium titanate and lithium tungstate). Of the non-silicon compounds, oxides of metals having a smaller change in Gibbs free energy for oxidation than silicon (for example, oxides of metals such as Cu, Mn and Fe) are not preferable because the use of such compounds causes the Si phases A to be unnecessarily oxidized and the capacity to be decreased. Further, metals having a larger change in Gibbs free energy for oxidation than silicon (for example, metals such as Li, Ti and Al) are not preferable because the $SiO_2$ phases B are chemically reduced and the amount of the phases B as the buffer phases is decreased. More preferably, the phases D can interact with the electrolytic solution so as to produce an effect of suppressing decomposition or can suppress the excessive decomposition of the electrolytic solution by serving as a coat to prevent contact with the electrolytic solution.

The negative electrode active material particles 33 may have voids. The presence of voids makes it possible to reduce the volume change during charging and discharging, resulting in an improvement in cycle characteristics. The size of the voids is preferably not more than 500 nm, and more preferably not more than 100 nm. The size of the voids may be measured by SEM. Excessively large voids are not preferable because large amounts of the binder will be contained therein and consequently it becomes difficult to obtain a solid electrode plate. The voids are formed as a result of the presence of spaces before sintering. Thus, it is possible to control the size and the amount of the voids by, for example, controlling the grain size of the two-phase particles 53 before sintering or by controlling the pressure during pressure sintering. Alternatively, the voids may be formed by mixing beforehand an organic compound or an oxide that is pyrolyzed or sublimated during sintering. For example, the voids may be formed by mixing $SiO_2$ beforehand and allowing the $SiO_2$ to react with silicon, thereby sublimating SiO gas.

[Separators 40]

The separator 40 may be a porous sheet having ion permeability and insulating properties. Specific examples of the porous sheets include microporous thin films, woven fabrics and nonwoven fabrics. Examples of suitable materials for the separators 40 include celluloses and olefin resins such as polyethylene and polypropylene.

[Nonaqueous Electrolytes]

The nonaqueous electrolyte includes a nonaqueous solvent and an electrolyte salt dissolved in the nonaqueous solvent. The nonaqueous electrolytes are not limited to liquid electrolytes (nonaqueous electrolytic solutions), and may be solid electrolytes such as gelled polymer electrolytes. Examples of the nonaqueous solvents include esters, ethers, nitriles such as acetonitrile, amides such as dimethylformamide, and mixed solvents containing two or more of these solvents.

Examples of the esters include cyclic carbonate esters such as ethylene carbonate, propylene carbonate and butylene carbonate, chain carbonate esters such as dimethyl carbonate, methylethyl carbonate (MEC), diethyl carbonate, methylpropyl carbonate, ethylpropyl carbonate and methylisopropyl carbonate, and carboxylate esters such as methyl acetate, ethyl acetate, propyl acetate, methyl propionate, ethyl propionate and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl.

The nonaqueous solvent may be a halogen-substituted compound resulting from the substitution of hydrogen atoms in any of the above solvents with halogen atoms such as fluorine atoms. Preferred examples of the halogen-substituted compounds include fluorinated cyclic carbonate esters such as fluoroethylene carbonate (FEC), and fluorinated chain esters such as fluoroethylmethyl carbonate.

The electrolyte salt is preferably a lithium salt. Examples of the lithium salts include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m are integers of 1 or greater), $LiC(C_pF_{2p+1}SO_2)(C_qF_{2q+1}SO_2)(C_rF_{2r+1}SO_2)$ (p, q and r are integers of 1 or greater), $Li[B(C_2O_4)_2]$ (lithium bis(oxalato)borate(LiBOB)), $Li[B(C_2O_4)F_2]$, $Li[P(C_2O_4)F_4]$, $Li[P(C_2O_4)_2F_2]$, and mixtures of two or more of these lithium salts.

EXAMPLES

Hereinbelow, the present invention will be further described based on EXAMPLES. However, the scope of the invention is not limited to such EXAMPLES.

Example 1

[Fabrication of Negative Electrode]
(1) Fabrication of Negative Electrode Active Material Particles a1

First, a Si ingot (3N) manufactured by a metallurgical method was crushed into particulate Si prisms approximately 1 mm in size. To produce fine primary particles P1 from the particulate silicon, the particulate Si prisms were crushed with a mechanical milling apparatus (a rotary ball mill). Specifically, 5 kg of the particulate Si prisms were placed into a stainless steel container (200 L) together with stainless steel balls (30 mm in diameter, 180 kg), the container was set on the mechanical milling apparatus, and the particles were treated for 50 hours so as to obtain a BET specific surface area of not more than 30 $m^2/g$. The resultant primary particles P1 of silicon (first phases A) were observed by SEM and were found to have an average particle diameter of not more than 100 nm and a BET specific surface area of 17.1 $m^2/g$.

Next, the primary particles P1 were exposed to the air and the surface of silicon (first phases A) was naturally oxidized to form second phases B. Thus, two-phase particles P2 were formed which had silicon as the core and $SiO_2$ as the shell. The thickness of $SiO_2$ was not more than 10 nm. Next, a heat treatment was performed in an inert gas atmosphere at an increased pressure of 196 MPa and 1000° C. for 4 hours to sinter the two-phase particles P2. Thereafter, the sintered product was crushed and classified with a jet mill (counter jet mill "AFG" manufactured by HOSOKAWA MICRON CORPORATION) so as to obtain a $D_{50}$ of about 8 μm, thereby producing negative electrode active material particles a1. As will be described later in Table 1, the negative electrode active material particles a1 prepared as described above had a $D_{50}$ of 8.44 μm and a BET specific surface area of 0.82 $m^2/g$.

(2) Preparation of Negative Electrode Binder Precursor Solution

An ester of benzophenonetetracarboxylic acid dianhydride with two equivalent weights of ethanol, and m-phenylenediamine were dissolved in N-methyl-2-pyrrolidone (NMP) in a molar ratio of 1:1. A binder precursor solution was thus obtained.

(3) Preparation of Negative Electrode Material Mixture Slurry

The negative electrode active material particles a1, a graphite powder as a conductive material which had a $D_{50}$ of 3 μm and a BET specific surface area of 12.5 $m^2/g$ and the negative electrode binder precursor solution were mixed together in a weight ratio of 86:4:10 (excluding NMP and based on the weight of solid imide formed after the polymerization reaction). A negative electrode material mixture slurry was thus obtained.

(4) Formation of Negative Electrode Active Material Layers

The negative electrode material mixture slurry was applied to both sides of a negative electrode collector and was dried at 120° C. (in the air). The negative electrode collector was a copper alloy foil (a C7025 alloy foil, composition: Cu 96.2 wt %, Ni 3 wt %, Si 0.65 wt %, Mg 0.15 wt %) with a thickness of 18 μm that had been roughened by electrolytic copper plating such that the surface roughness Ra (JIS B 0601-1994) was 0.25 μm and the average peak-to-peak spacing S (JIS B 0601-1994) was 0.85 μm. The dried film was rolled, cut into a prescribed size (a rectangle 380 mm in length and 52 mm in width), and heat treated in an argon atmosphere at 400° C. for 10 hours. Consequently, negative electrode active material layers were formed in an amount of 6.0 $mg/cm^2$ (the total of both sides) and with a thickness of 40 μm (the total of both sides) on the negative electrode collector.

The following experiment was performed in order to confirm the formation of a polyimide compound from the binder precursor solution by the negative electrode heat treatment. The binder precursor solution was dried in the air at 120° C. to remove NMP, and the residue was heat treated in an argon atmosphere at 300° C. for 10 hours similarly to the negative electrode heat treatment. The compound obtained by the heat treatment was analyzed by infrared absorption spectroscopy, and a peak assigned to the imide bond was detected at near 1720 $cm^{-1}$. Thus, it was confirmed that the heat treatment of the binder precursor solution had caused polymerization reaction and imidization reaction to proceed to form a polyimide compound. The glass transition temperature (Tg) of the compound obtained by the heat treatment was measured by differential scanning calorimetry (DSC). As a result, Tg=290° C.

Lastly, a nickel plate as a negative electrode tab was connected to an end (an uncoated portion) of the negative electrode collector exposed from the negative electrode active material layers. Thus, a negative electrode was obtained.

[Fabrication of Positive Electrode]

In a mortar, $Li_2CO_3$ and $CoCO_3$ were mixed with each other in a Li:Co molar ratio of 1:1. The mixture was heat treated in the air at 800° C. for 24 hours and the product was crushed to afford a positive electrode active material. The positive electrode active material particles were lithium cobalt composite oxide particles having a $D_{50}$ of 10 μm, a BET specific surface area of 0.37 m²/g and a composition represented by $LiCoO_2$.

The positive electrode active material, a carbon material powder as a conductive material and PVdF as a binder were added to NMP in a weight ratio of 95:2.5:2.5. The mixture was kneaded to give a positive electrode material mixture slurry. The positive electrode material mixture slurry was applied to both sides of a positive electrode collector (to a front side area 340 mm in length and 50 mm in width and to a backside area 270 mm in length and 50 mm in width) and was dried at 120° C. (in the air). The positive electrode collector was an aluminum foil having a thickness of 15 μm, a length of 402 mm and a width of 50 mm. In this manner, positive electrode active material layers were formed in an amount of 49 mg/cm² (the total of the active material layers on both sides) and with a thickness of 135 μm (the total of both sides) on the positive electrode collector.

Lastly, an aluminum plate as a positive electrode tab was connected to an end (an uncoated portion) of the positive electrode collector exposed from the positive electrode active material layers. Thus, a positive electrode was obtained.

[Preparation of Nonaqueous Electrolytic Solution]

In an argon atmosphere, $LiPF_6$ was dissolved with a concentration of 1 mol/L in a nonaqueous solvent containing FEC and MEC in a volume ratio of 2:8. Thereafter, carbon dioxide gas was dissolved with a concentration of 0.4 wt % in the solution. A nonaqueous electrolytic solution was thus obtained.

[Fabrication of Electrode Assembly]

One sheet of the positive electrode, one sheet of the negative electrode and two sheets of separators were wound together into an electrode assembly. The separators were polyethylene microporous films having a thickness of 20 μm, a length of 450 mm, a width of 54.5 mm, a sticking load of 340 g and a porosity of 45%. First, the components were stacked on top of one another such that the positive electrode and the negative electrode were opposed to each other via the separator, and the stack was wound around a cylindrical core into a coil such that the tabs would come on the outermost periphery. Thereafter, the core was pulled out from the (cylindrical) coil, and the coil was crushed in one direction perpendicular to the direction of the axis of the cylinder. In this manner, a flat electrode assembly such as one illustrated in FIG. 2 was obtained.

[Fabrication of Secondary Battery]

In a carbon dioxide atmosphere at 25° C. and 1 atm, the electrode assembly and the nonaqueous electrolytic solution were placed into a package composed of aluminum laminate films. The opening was heat sealed. Thus, a test cell T1 that was a laminate battery such as one illustrated in FIG. 1 was obtained.

Example 2

A test cell T2 was obtained in the same manner as in EXAMPLE 1, except that the negative electrode active material particles a1 were replaced by negative electrode active material particles a2 that had been prepared by heat treating the two-phase particles P2 at normal pressure and 1300° C. for 10 hours.

Example 3

A test cell T3 was obtained in the same manner as in EXAMPLE 1, except that the negative electrode active material particles a1 were replaced by negative electrode active material particles a3 that had been prepared by heat treating the two-phase particles P2 at normal pressure and 1200° C. for 10 hours.

Example 4

A test cell T4 was obtained in the same manner as in EXAMPLE 1, except that the negative electrode active material particles a1 were replaced by negative electrode active material particles a4 that had been prepared by adding 64 g of a $Y_2O_3$ powder (particle diameter about 7 μm) to 5 kg of the particulate Si prisms at the time of mechanical milling.

Example 5

A test cell T5 was obtained in the same manner as in EXAMPLE 1, except that the negative electrode active material particles a1 were replaced by negative electrode active material particles a5 that had been prepared by adding 57 g of an $Er_2O_3$ powder (particle diameter about 7 μm) to 5 kg of the particulate Si prisms at the time of mechanical milling.

Example 6

A test cell T6 was obtained in the same manner as in EXAMPLE 1, except that the negative electrode active material particles a1 were replaced by negative electrode active material particles a6 that had been prepared by adding 188 g of a LiF powder (particle diameter about 7 μm) to 5 kg of the particulate Si prisms at the time of mechanical milling.

Comparative Example 1

A test cell Z1 was obtained in the same manner as in EXAMPLE 1, except that the negative electrode active material particles a1 were replaced by negative electrode active material particles b1 (having a Si/O molar ratio of approximately 1) that had been prepared by a gas phase method in which an equimolar mixture of a Si powder and a $SiO_2$ powder was heat treated while recovering the vapor generated.

Comparative Example 2

A test cell Z2 was obtained in the same manner as in COMPARATIVE EXAMPLE 1, except that negative electrode active material particles b2 were used which had been prepared by heat treating the negative electrode active material particles b1 at normal pressure and 1000° C. for 5 hours.

Comparative Example 3

A test cell Z3 was obtained in the same manner as in EXAMPLE 1, except that the negative electrode active material particles a1 were replaced by negative electrode active material particles b3 that had been prepared by crushing and classifying a Si ingot (3N) manufactured by a metallurgical method.

The negative electrode active material particles a1 to a4 of EXAMPLES and negative electrode active material particles b1 to b3 of COMPARATIVE EXAMPLES were tested as described below to evaluate the crystallite size, the $D_{50}$, the BET specific surface area, the oxygen concentration, the Raman intensity ratio ($RI_{480}/RI_{510}$), the XRD intensity ratio ($RI_{480}/RI_{510}$), and the concentrations of elements other than silicon and oxygen. The results are described in Table 1.

[Evaluation of Crystallite Size]

The crystallite size Lc was obtained by the following calculation method (the Scherrer equation).

$$Lc = K\lambda/(\beta \cos\theta)$$

K: Scherrer constant (=0.9400)
λ: wavelength of X-ray beam (=1.54056 Å)
β: full width at half maximum of peak (radian)
θ: Bragg angle in X-ray diffraction

[Evaluation of $D_{50}$]

The $D_{50}$ was measured with laser diffraction scattering grain size distribution analyzer "LA-750" manufactured by HORIBA, Ltd. using water as the dispersion medium.

[Evaluation of BET Specific Surface Area]

The BET specific surface area was measured with gas adsorption apparatus "TriStar 2 3020" manufactured by Micromeritics Japan using $N_2$ gas as the adsorption medium.

[Evaluation of Oxygen Concentration]

The concentration was measured with oxygen nitrogen analyzer "EMGA-800" manufactured by HORIBA, Ltd.

[Evaluation of Raman Intensity Ratio ($RI_{480}/RI_{510}$)]

A Raman spectrum was recorded by the following method, and ($RI_{480}/RI_{510}$) was determined.

Measurement apparatus: microscopic laser Raman spectrometer "Lab RAM ARAMIS" manufactured by HORIBA, Ltd.

Spectrum processing: From the spectrum obtained, the noise below the baseline was subtracted while setting the baseline points at near 1100 cm$^{-1}$ and 1700 cm$^{-1}$.

[Evaluation of XRD Intensity Ratio ($XI_{21.6}/XI_{28.4}$)]

The intensity ratio was determined with powder X-ray diffractometer "RINT-TTR" manufactured by Rigaku Corporation.

[Evaluation of Element Concentrations]

The concentrations were determined with ICP emission spectrophotometer "SPS3100" manufactured by SII Nano Technology.

[Evaluation of Charge/Discharge Characteristics]

The test cells T1 to T3 of EXAMPLES and the test cells Z1 to Z3 of COMPARATIVE EXAMPLES were tested under the following charge/discharge cycle conditions to evaluate charge/discharge characteristics (the initial charge/discharge efficiency and the cycle life). The evaluation results are described in Table 2.

(Charge/Discharge Cycle Conditions)

Conditions of Charging in First Cycle

The cell was charged at a constant current of 0.05 C for 4 hours and was thereafter charged at a constant current of 0.2 C until the cell voltage reached 4.20 V. Further, the cell was charged at a constant voltage of 4.20 V until the current value reached 0.05 C.

Conditions of Discharging in First Cycle

The cell was discharged at a constant current of 0.2 C until the cell voltage reached 2.75 V.

Conditions of Charging in Second and Later Cycles

The cell was charged at a constant current of 1 C until the cell voltage reached 4.20 V, and was further charged at a constant voltage of 4.20 V until the current value reached 0.05 C.

Conditions of Discharging in Second and Later Cycles

The cell was discharged at a constant current of 1 C until the cell voltage reached 2.75 V.

The initial charge/discharge efficiency and the cycle life were determined by the following calculation methods.

Initial charge/discharge efficiency=(Discharge capacity in first cycle/Charge capacity in first cycle)×100

Load characteristics=(Discharge capacity at discharging rate of 1 C/Discharge capacity at discharging capacity of 0.2 C)×100

Charge/Discharge Cycle Characteristics (1) Rate of capacity retention after 10 cycles (discharge capacity in 10th cycle divided by discharge capacity in 3rd cycle)

(2) Rate of capacity retention after 250 cycles (discharge capacity in 250th cycle divided by discharge capacity in 3rd cycle)

TABLE 1

|   | Crystallite size (Å) | $D_{50}$ (μm) | Specific surface area (m²/g) | Oxygen concentration (wt %) | Raman intensity ratio | XRD intensity ratio | Concentrations of elements (wt %) |
|---|---|---|---|---|---|---|---|
| a1 | 418 | 8.44 | 0.82 | 1.74 | 0.01 | 0.01 | |
| a2 | 671 | 8.21 | 0.83 | 1.43 | 0.01 | 0 | |
| a3 | 465 | 7.9 | 2.34 | 1.34 | 0.01 | 0 | |
| a4 | 307 | 8.73 | 2.21 | 2.1 | 0.04 | 0 | Y: 0.96 |
| a5 | 363 | 8.84 | 0.924 | 1.96 | 0.1 | 0 | Er: 0.99 |
| a6 | 396 | 8.87 | 1.11 | 2.1 | 0.1 | 0.01 | Li: 0.84 |
| b1 | Measurement impossible | 4.3 | 4.8 | 35 | 0.95 | 1.89 | |
| b2 | 33 | 5.4 | 4.9 | 31 | 0.46 | 1.48 | |
| b3 | 926 | 9.3 | 0.7 | 0.1 | 0 | 0 | |

TABLE 2

| | Initial charge/ discharge efficiency [02 C] | 1/02 C efficiency (%) | Cycle characteristics | |
|---|---|---|---|---|
| | | | 10 cyc (%) | 250 cyc (%) |
| T1 | 84.5 | 95.6 | 99 | 74 |
| T2 | 84.7 | 95.7 | 98 | 70 |
| T3 | 84.4 | 96.2 | 99 | 66 |
| T4 | 83.6 | 94.8 | 98 | 75 |
| T5 | 83.9 | 94.7 | 99 | 77 |
| T6 | 86.4 | 95.2 | 98 | 66 |
| Z1 | 40.9 | 73.2 | 94 | Test discontinued |
| Z2 | 60 | 93.4 | 94 | Test discontinued |
| Z3 | 84.8 | 96.5 | 99 | 62 |

As a result of EDS measurement, the negative electrode active material particles a1 gave rise to a clear peak assigned to oxygen and it was shown that $SiO_2$ was finely and substantially uniformly dispersed in the particles. In the case of the negative electrode active material particles b3 manufactured by a metallurgical method, on the other hand, no oxygen peak was observed and the amount of oxygen was below the detection limit.

Figure 7:
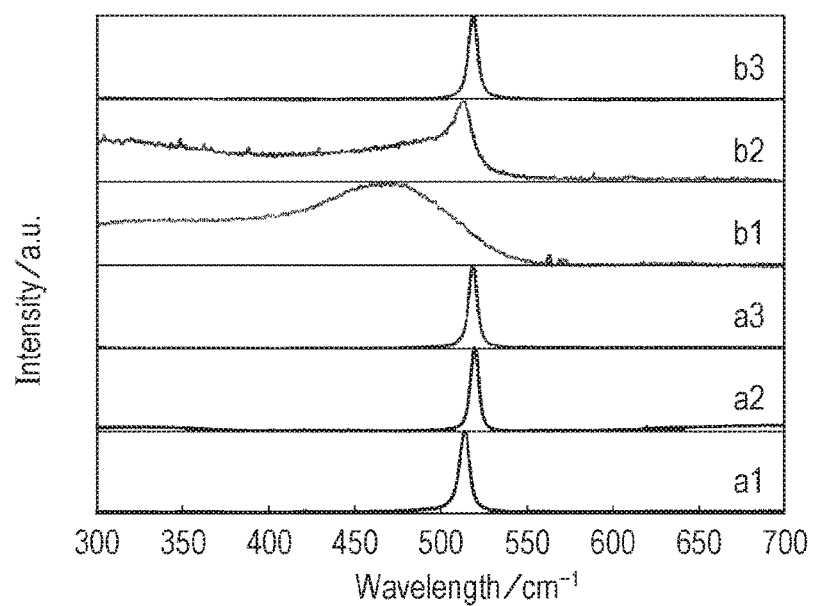
FIG. 7 illustrates Raman spectra of negative electrode active materials used in EXAMPLES and COMPARATIVE EXAMPLES.

FIG. 7 illustrates Raman spectra of the negative electrode active material particles.

In the negative electrode active material particles a1 and the highly crystalline negative electrode active material particles b3, the ratio of the amorphous silicon peak intensity to the crystalline silicon peak intensity ($RI_{480}/RI_{510}$) was as low as 0.01. In contrast, the negative electrode active material particles b1 produced with the introduction of oxygen had a large proportion of amorphous silicon, with the Raman intensity ratio ($RI_{480}/RI_{510}$) being approximately 0.95. Namely, it has been shown that the negative electrode active material particles a1 and b1 have a large difference in the Raman intensity ratio and thus have different properties.

The negative electrode active material particles b2 are particles obtained by the heat treatment of the particles b1 at 1000° C. The Raman measurement with respect to the particles b2 resulted in a Raman intensity ratio of 0.46. It is thus assumed that the amorphous structure remained even after the heat treatment although the proportion thereof was lower than in the particles b1 that were not heat treated.

Figure 8:
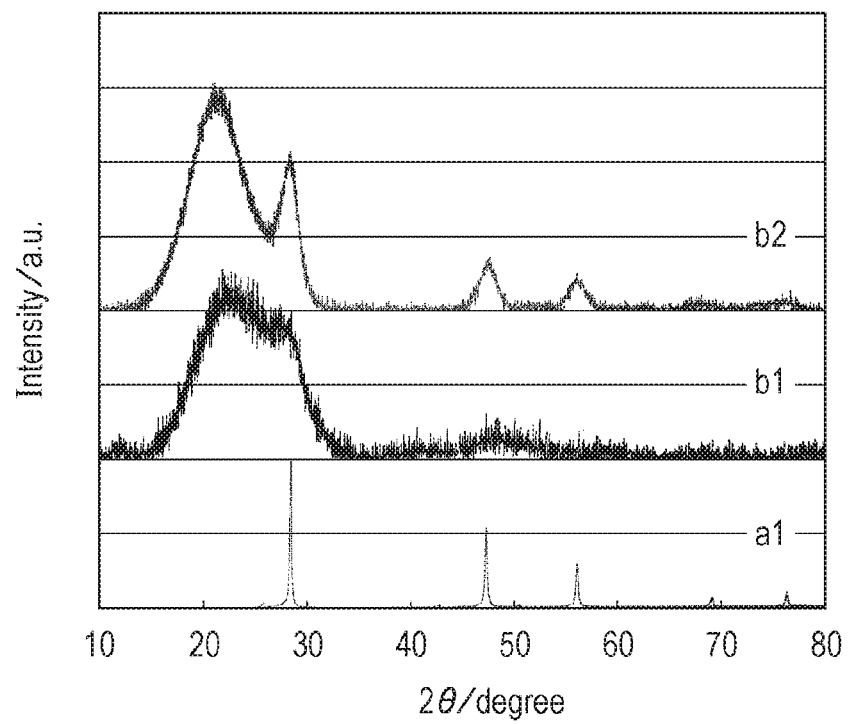
FIG. 8 illustrates X-ray diffraction patterns of negative electrode active materials used in EXAMPLES and COMPARATIVE EXAMPLES.

FIG. 8 illustrates XRD patterns of the negative electrode active material particles.

The negative electrode active material particles a1 and the heat-treated negative electrode active material particles b2 gave rise to a peak at 2θ=28.4, showing that crystallization had proceeded. Further, the pattern of the negative electrode active material particles a1 had no peak assigned to $SiO_2$ at near 2θ=21.4, showing that the particles were substantially free from any structures formed by $SiO_2$.

The negative electrode active material particles a1 are such that $SiO_2$ is uniformly introduced inside the particles while the particles are composed of crystalline silicon phases without $SiO_2$ forming any structures. That is, it has been shown that the negative electrode active material particles a1 are apparently different from particles prepared by a gas phase method. The negative electrode active material particles a4 contain $Y_2O_3$ phases inside the particles in addition to Si and $SiO_2$. Similarly, the negative electrode active material particles a5 and a6 contain $Er_2O_3$ layers and LiF layers, respectively.

As apparent from Table 2, the test cell T1 which included the negative electrode active material particles a3 as a constituent material have been shown to exhibit enhanced cycle characteristics as compared to the test cell Z3 having the oxygen-free negative electrode active material particles b3 as a constituent material. The test cells T1 to T3 contained the negative electrode active material particles with a Raman intensity ratio of not more than 0.1 and an XRD intensity ratio of not more than 0.1. These test cells containing such a constituent material have been demonstrated to have excellent initial charge/discharge efficiency and excellent cycle characteristics as compared even to the test cells Z1 and Z2 which involved the oxygen-containing negative electrode active material particles as a constituent material. Further, the test cells T4 to T6 in which the constituent materials of interest were the negative electrode active material particles a4 to a6 containing a rare earth oxide or a metal fluoride have been shown to exhibit excellent initial charge/discharge efficiency and excellent cycle characteristics. In particular, the test cells T4 and T5 in which the constituent material of interest was the negative electrode active material particles a4 or a5 containing $Y_2O_3$ or $Er_2O_3$ have been demonstrated to exhibit superior cycle characteristics.

INDUSTRIAL APPLICABILITY

For example, the present invention may be applied to drive power supplies in mobile information terminals such as cellular phones, notebook computers and PDA, in particular, to such applications requiring a high energy density.

REFERENCE SIGNS LIST

10 NONAQUEOUS ELECTROLYTE SECONDARY BATTERY (SECONDARY BATTERY), 11 PACKAGE, 11a 11b LAMINATE FILMS, 12 CONTAINER SECTION, 13 SEAL, 14 ELECTRODE ASSEMBLY, 15 POSITIVE ELECTRODE TAB, 16 NEGATIVE ELECTRODE TAB, 20 POSITIVE ELECTRODE, 21 POSITIVE ELECTRODE COLLECTOR, 22 POSITIVE ELECTRODE ACTIVE MATERIAL LAYER, 30 NEGATIVE ELECTRODE, 31 NEGATIVE ELECTRODE COLLECTOR, 32 NEGATIVE ELECTRODE ACTIVE MATERIAL LAYER, 33 PARTICULATE NEGATIVE ELECTRODE ACTIVE MATERIAL (NEGATIVE ELECTRODE ACTIVE MATERIAL PARTICLE), 34 TWO-PHASE REGION, 40 SEPARATOR, 50 Si INGOT, 51 PRIMARY PARTICLE, 52 CRYSTALLITE, 53 TWO-PHASE PARTICLE, A B C D PHASES

The invention claimed is:

1. A negative electrode active material particle for a nonaqueous electrolyte secondary battery, the negative electrode active material particle comprising a plurality of regions in the negative electrode active material particle wherein each region of the plurality of regions includes a first phase containing silicon and a second phase containing silicon oxide on the first phase,
   wherein a ratio of a second intensity emitted by amorphous silicon to a first intensity emitted by crystalline silicon obtained from Raman spectroscopy of the negative electrode active material particle is not more than 0.04, and
   a ratio of a third intensity emitted by $SiO_2$ to a fourth intensity emitted by Si(111) in an X-ray diffraction pattern obtained from X-ray diffractometry of the negative electrode active material particle is not more than 0.1,
   wherein BET specific surface area of the negative electrode active material particle is not more than 10 m²/g.

2. The negative electrode active material particle according to claim 1,
   wherein the ratio of the second intensity to the first intensity is not more than 0.01.

3. The negative electrode active material particle according to claim 1,
   wherein the first intensity is about 510 $cm^{-1}$ wavelength in a Raman spectrum and the second intensity is about 480 $cm^{-1}$ wavelength in the Raman spectrum.

4. The negative electrode active material particle according to claim 1,
   wherein the ratio of the third intensity to the fourth intensity is not more than 0.01.

5. The negative electrode active material particle according to claim 1,
   wherein the third intensity is about $2\theta=21.6°$ in the X-ray diffraction pattern and the fourth intensity is about $2\theta=28.4°$ in the X-ray diffraction pattern.

6. The negative electrode active material particle according to claim 1,
   wherein the negative electrode active material particle contains silicate salts.

7. The negative electrode active material particle according to claim 1,
   wherein the negative electrode active material particle contains lithium silicate.

8. The negative electrode active material particle according to claim 1,
   wherein the negative electrode active material particle contains a non-silicon compound.

* * * * *